(12) United States Patent
Bridges et al.

(10) Patent No.: US 10,796,528 B2
(45) Date of Patent: *Oct. 6, 2020

(54) ELECTRONIC GAMING SYSTEM AND METHOD

(71) Applicant: WYMAC GAMING SOLUTIONS PTY LTD, Oakleigh (AU)

(72) Inventors: Daryl Bridges, Oakleigh (AU); Andrew Wyer, Oakleigh (AU); Simon Riley, Oakleigh (AU); Matthew Moss, Oakleigh (AU)

(73) Assignee: WYMAC GAMING SOLUTIONS PTY LTD, Oakleigh (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/157,546

(22) Filed: Oct. 11, 2018

(65) Prior Publication Data

US 2019/0114878 A1 Apr. 18, 2019

(30) Foreign Application Priority Data

Oct. 12, 2017 (AU) ................................ 2017904117

(51) Int. Cl.
*A63F 9/24* (2006.01)
*G07F 17/32* (2006.01)
*G06F 7/58* (2006.01)

(52) U.S. Cl.
CPC .......... *G07F 17/3244* (2013.01); *G06F 7/588* (2013.01); *G07F 17/3267* (2013.01); *G07F 17/3269* (2013.01); *G07F 17/3295* (2013.01)

(58) Field of Classification Search
CPC ............. G07F 17/3244; G07F 17/3295; G07F 17/3267; G07F 17/3269
See application file for complete search history.

(56) References Cited

U.S. PATENT DOCUMENTS 8,678,917 B1 * 3/2014 Friedman .............. G07F 17/323
463/16
8,753,193 B2 6/2014 Popovich et al.
(Continued)

FOREIGN PATENT DOCUMENTS

AU 2011200434 A1 2/2011
WO 11/120592 A2 10/2011

*Primary Examiner* — Steve Rowland
(74) *Attorney, Agent, or Firm* — Eversheds Sutherland (US) LLP

(57) ABSTRACT

The present invention provides a gaming system for operation on a mobile user interface or in an Internet browser, which includes: a display unit configured to display a gaming interface, and a score interface; a console for receiving payment instructions from a player; a game controller programmed to present at least one game of chance and at least one game of skill. The game controller includes a random number generator (RNG), a score calculator and a timer. A display controller is included and activated by said game controller to display at least one of said game of chance and one of said game of skill and to display a score and a game timer. A program of the game controller runs an algorithm that determines that the long-term return to player (RTP) from the gaming machine lies between a minimum specified percentage and a maximum specified percentage. The algorithm includes functions dependent on the random number generator (RNG), the score from the game of skill and the time elapsed during the game of skill.

9 Claims, 5 Drawing Sheets

(56) References Cited

U.S. PATENT DOCUMENTS

| | | |
|---|---|---|
| 8,986,117 B2 | 3/2015 | Arnone et al. |
| 2008/0102928 A1* | 5/2008 | Daley .................... G07F 17/32 463/20 |
| 2009/0061999 A1* | 3/2009 | Popovich ................ G07F 17/32 463/26 |
| 2009/0124373 A1* | 5/2009 | Acres ..................... G07F 17/32 463/29 |
| 2010/0120506 A1 | 5/2010 | Davis et al. |
| 2013/0178273 A1 | 7/2013 | De Waal et al. |
| 2013/0324214 A1 | 12/2013 | Shaw et al. |
| 2014/0080600 A1* | 3/2014 | Knutsson ............... G07F 17/32 463/31 |
| 2015/0011290 A1 | 1/2015 | Galansky |
| 2018/0268660 A1* | 9/2018 | Rottcher ............. G07F 17/3267 |
| 2019/0096182 A1* | 3/2019 | Oberberger ......... G07F 17/3244 |
| 2019/0096186 A1* | 3/2019 | Oberberger ......... G07F 17/3267 |
| 2019/0102994 A1* | 4/2019 | Riggs ................. G07F 17/3267 |
| 2019/0147706 A1* | 5/2019 | Bolling, Jr. ......... G07F 17/3295 |
| 2019/0287344 A1* | 9/2019 | Oberberger ......... G07F 17/3244 |

* cited by examiner

FIXED TIME

3 SYMBOLS   4 SYMBOLS   5 SYMBOLS

+5 SEC     +5 SEC     +5 SEC

VARIABLE TIME

3 SYMBOLS   4 SYMBOLS   5 SYMBOLS

+5 SEC     +10 SEC    +15 SEC

TYPES OF SYMBOLS

3 SYMBOLS        3 SYMBOLS with special symbol

+5 SEC           +10 SEC

ELECTRONIC GAMING SYSTEM AND METHOD

RELATED APPLICATIONS

This application claims priority to Australian Provisional Patent Application No. 2017904117 in the name of Wymac Gaming Solutions Pty Ltd, which was filed on 12 Oct. 2017, entitled "Electronic Gaming" and the specification thereof is incorporated herein by reference in its entirety and for all purposes.

FIELD OF INVENTION

This invention relates to improvements in electronic gaming systems including computer implemented online games and casino style games that use random number generators that provide the basis for games of chance. These games may be played on a mobile user interface or in a browser.

BACKGROUND TO THE INVENTION

Most electronic casino games of chance rely on a random number generator to provide the chance outcome for games and on an algorithm that modifies the outcome to provide a return to player within a specified range. Government regulations will usually set a minimum return to player and the return to the venue is usually determined by setting the upper limit for the return to player value. To make games more interesting it has been proposed to introduce a level of skill into this type of game.

WO 11/120592 relates to a gaming machine having a base game, being a game of chance, and a feature game, which may be a game of skill. The results of the base game may change the attributes of the characters of the feature game, depending on the symbols displayed on the reels. The attributes of the characters may affect the likelihood of success in the feature game. The game allows the player to choose their character and swap characters at any point of the game.

Patent AU 2011200434 discloses a method wherein a software agent utilised by a player, allows for selection of skill level.

U.S. Pat. No. 8,753,193 discloses a return driven game outcome generator which enables games to measure and reward skill. Participants can purchase a time-based contract and rewards are provided when the skill game generates a score. Also, the skill game can change the view to provide a full view landscape or the landscape is revealed gradually during the game.

USA application 2013/0178273 discloses a gaming system having a first skilled base game and a number of chance-based games triggered by events in the skill game.

U.S. Pat. No. 8,986,117 discloses a method of detecting unauthorised use of a hybrid game which consists of an entertainment game and a chance game.

A problem with gaming is to provide interesting rewards in addition to the monetary reward from the game of chance.

A problem in devising games where skill and chance are involved is to maintain the return to player within the desired range while rewarding the skill of the player.

It is an object of embodiments of this invention to provide a gaming machine that ameliorates this problem.

Other examples of prior art gaming machines and systems follow.

US 2015/0011290 (Galansky) is concerned with the deficiency in prior art gaming devices in which they lack for providing a secondary game played over a series of base game plays that associates the base game with the secondary game and that incentivizes the player to continue playing the base game in order to have an opportunity to achieve the desired winning outcome of the secondary game. Galansky addresses this by essentially providing a gaming device having a secondary game played in conjunction with a symbol-matrix base game. The symbol-matrix game includes a special designation symbol within the symbol set associated with the base game. Occurrences of the special designation symbol in the symbol-matrix base game are spatially re-represented in a secondary matrix that is a mirrored representation of the symbol-matrix from the base game. Through a series of plays of the base game, the occurrences of the special designation symbol accumulate until a pre-determined pattern is established in the secondary matrix indicating a winning outcome of the secondary game.

US 2010/0120506 (Davis et al) addresses the issue with gaming devices typically having predetermined paytables including predetermined winning combinations and predetermined awards and although the actual payback may vary during the course of game play, the expected payback for a gaming machine is predetermined and remains constant throughout game play. Davis et al provides a solution for providing new gaming machines which vary award returns and risk that involves a game operable upon a wager by a player which initially employs an initial or default paytable. The gaming device enables a player to place wagers on plays of the game. The gaming device displays the game outcomes and provides the player with any awards based on the game outcomes in accordance with the default paytable. Upon an occurrence of a triggering event, a bonus mode is triggered. When the bonus mode is triggered, the gaming device offers to replace the default paytable with a different one of the paytables for a limited number of future plays of the game, if the player agrees to make an additional wager on each of those future plays of the game. If the player chooses to accept the offer, the gaming device determines outcomes and provides any awards for the limited number of future plays in accordance with the new paytable, as long as the player continues placing the additional wager for each of those plays. If the player chooses not to accept the offer to replace the default paytable with a new paytable, the gaming device displays the number of future plays of the game without requiring the additional wager and provides any awards for those plays in accordance with the default paytable.

US 2013/0324214 (Nektan Limited) essentially discloses a gaming method that comprises: enabling a player to access a game of chance; triggering, in the game of chance, a bonus feature when a predetermined scenario occurs in the game of chance; providing to the player a skill game within the bonus feature; and returning to the game of chance after the skill game is completed by the player.

The preceding discussion of background art is intended to facilitate an understanding of the present invention only. The discussion is not an acknowledgement or admission that any of the material referred to is or was part of the common general knowledge as at the priority date of the application.

Accordingly, it is an object of the embodiments described herein to overcome or alleviate at least one of the above noted drawbacks of related art systems or to at least provide a useful alternative to related art systems.

SUMMARY OF INVENTION

To this end the present invention provides a gaming system for online games which includes:

a display unit configured to display a gaming interface, and a score interface;

a console for receiving payment instructions from a player;

a game controller programmed to present at least one game of chance said game controller including a random number generator, a score calculator and a timer;

a display controller activated by said game controller to display said game of chance and to display a score and a game timer;

said game controller including a program that runs an algorithm that determines that the long-term return to player from the gaming machine lies between a minimum specified percentage and a maximum specified percentage;

said algorithm including functions dependent on the random number generator (RNG), and the time provided for the game of chance.

The advantage derived from this arrangement is that time becomes a relevant commodity within the game structure by providing a reward of additional time while maintaining the return to player within a desired range.

The prior art noted above does not disclose or suggest a gaming machine or system in which a bonus may be provided in the form of awarding increments of time to a player, for example, where during a game of skill the score achieved within an allocated time may be used to increment the game timer with bonus playing time.

A player when using the gaming system will pay for a specified number of game elements. A game element is a game of chance determined by the random number generator. After each game of chance, the random number generator incrementally generates another random result and reduces the number of game element credits purchased by the player. Over a specified number of game elements the winnings earned by the player will fall within a predetermined range which has a minimum percentage. By providing time as a reward additional time for playing game elements may be provided to increase the return to player above the minimum percentage.

Once time is provided as a reward it can provide alternate games for the player. Games of skill may be provided during this reward time where the player may earn a score that can be used to increase the return to player above the minimum percentage. By introducing the games of skill and providing the time for playing the game of skill, the score earned during the games of skill can be used to increase the return to player above the minimum percentage up to the predetermined maximum percentage. One form of winning is to earn game element credits. Another form of winning which is now possible with this invention, is to provide game time in a game of skill or additional time for playing additional game elements. The score may also be used to provide additional game elements with higher odds.

The game of chance is usually a reels type game where matching icons on a number of spinning reels displayed on the display screen will provide a win value. In this invention a return above the minimum percentage can be provided by rewarding the player with additional game time. The game time can be used in a game of chance or a game of skill.

The game of skill may be a dexterity skill game such as touching various valued moving icons on the screen or a strategy-based game such as breaking a code.

The game of skill will be displayed as a feature after a series of game elements (the base game) have been played.

The game timer display may take any form that directly or intuitively informs the player of the time available or remaining in the game of skill.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF THE DRAWINGS

Preferred embodiments of the invention will now be described with reference to the drawings in which.

DETAILED DESCRIPTION OF THE INVENTION

Figure 1:
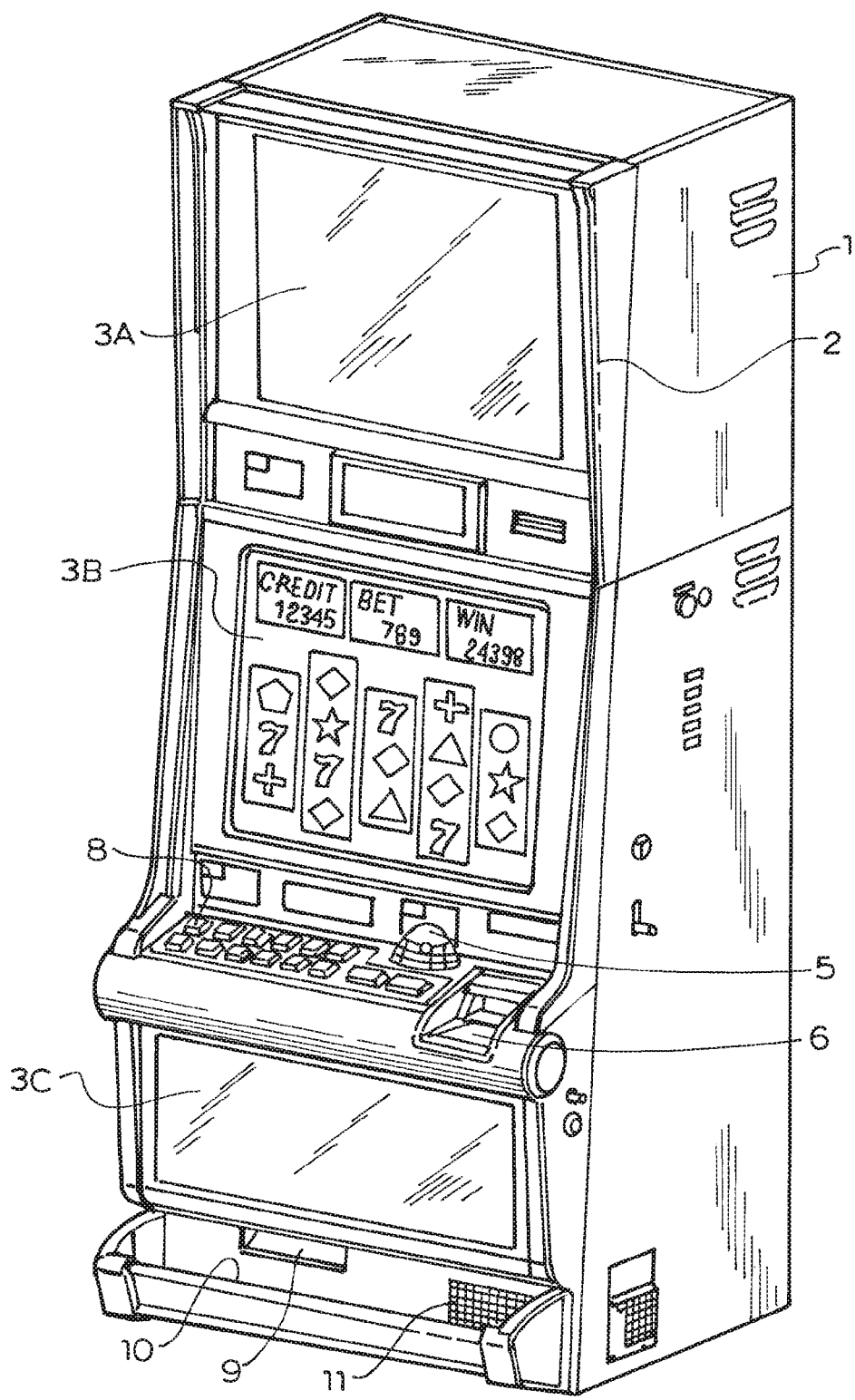
FIG. 1 depicts a typical electronic gaming machine for casino games.

As shown in FIG. 1 the gaming machine includes a player interface, a display screen for the games of chance and games of skill, a display screen for scores and game timer, a console for receiving player payments. Inside the cabinet is the game controller, and display controller.

In the following description the game of chance is a reels-based game. Playing time can be incrementally added to the game timer in a number of ways.

Event Triggered

During the course of the base game (a series of game elements) a game event may add a specified amount of time to the game timer. The amount of time will be determined by the algorithm. The event may be any event that occurs during the game of chance but is preferably any one of the following:

a specific symbol combination on the reels a random probability driven event a specified number of game elements have been played a specified number of symbols from the reels game have been collected.

Figure 2A:
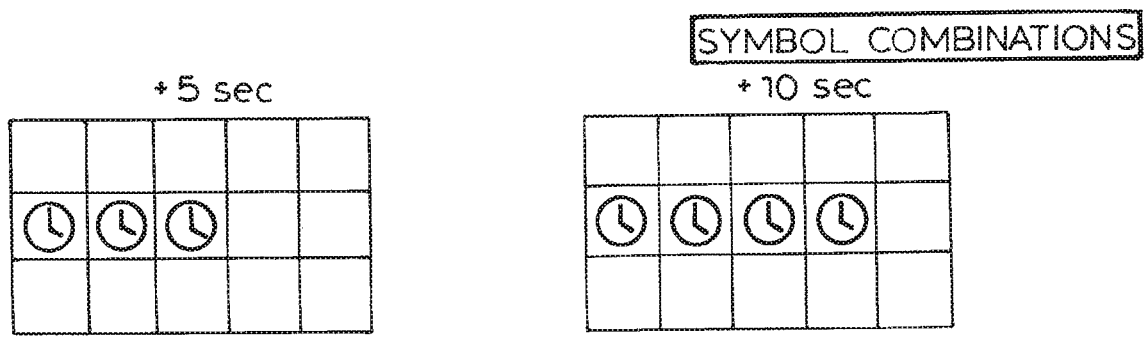
FIGS. 2A-2D schematically illustrate operation of a game timer display.

FIG. 2A illustrates the incrementing of the game timer by the occurrence of a specific combination of icons (clock icons in this example).

Figure 2B:
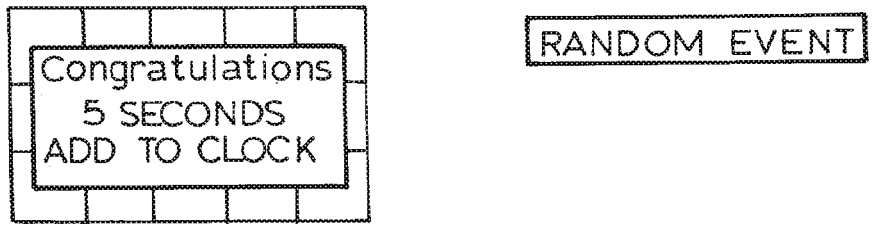

FIG. 2B illustrates the incrementing of the game timer by the occurrence of a random event generated by the RNG.

Figure 2C:
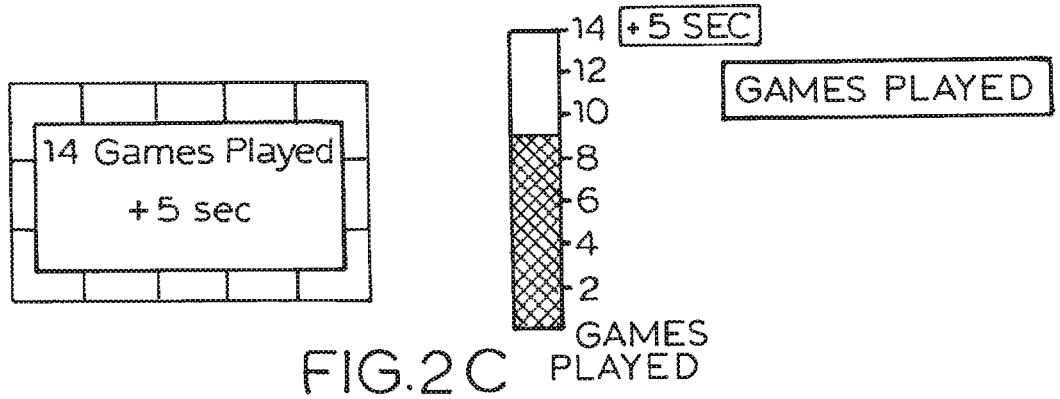
Figure 2D:
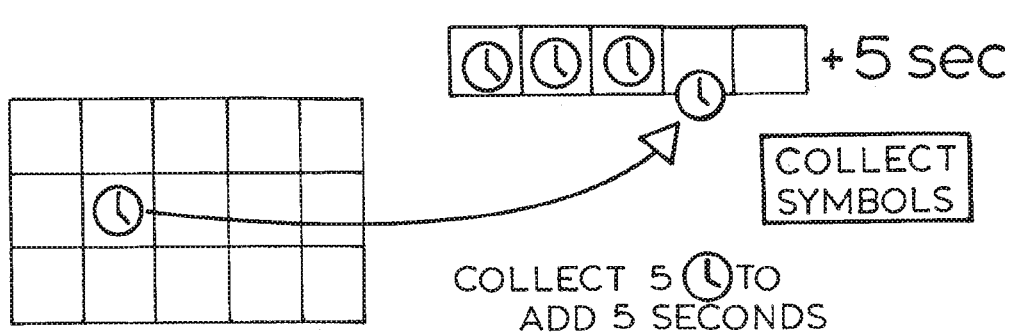

FIG. 2C illustrates the incrementing of the game timer by the conclusion of a specified number of games.

In each case the clock icon symbols are collected and displayed in the game timer display as shown in 2D.

The "feature" game of skill is displayed for playing based on the triggers illustrated in FIG. 4.

Figure 4A:
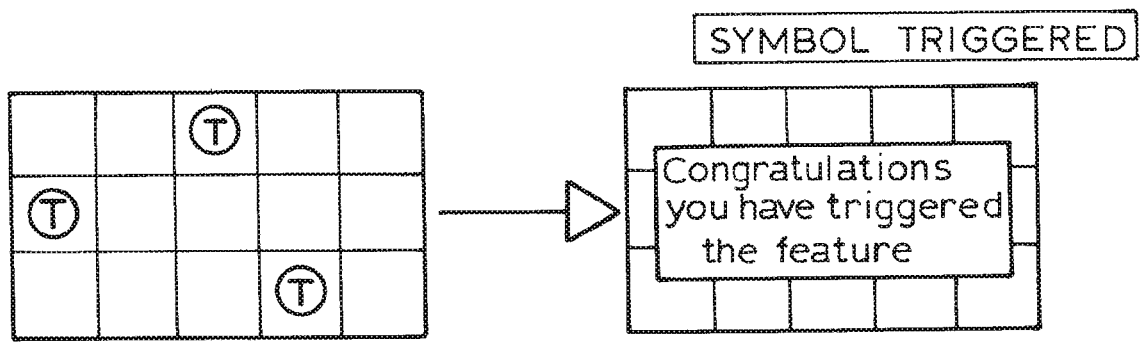
FIGS. 4A-4C schematically illustrate operation of a game trigger display.
Figure 4B:
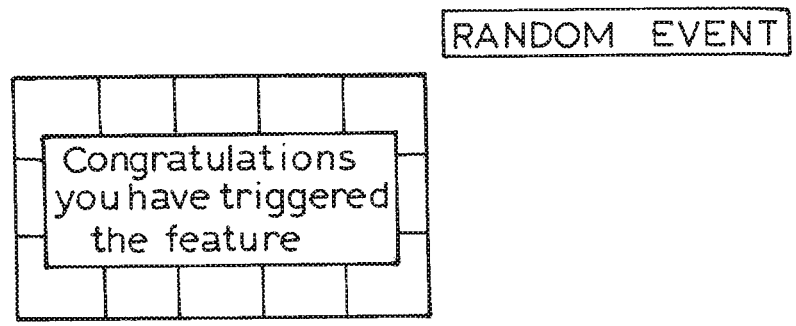
Figure 4C:
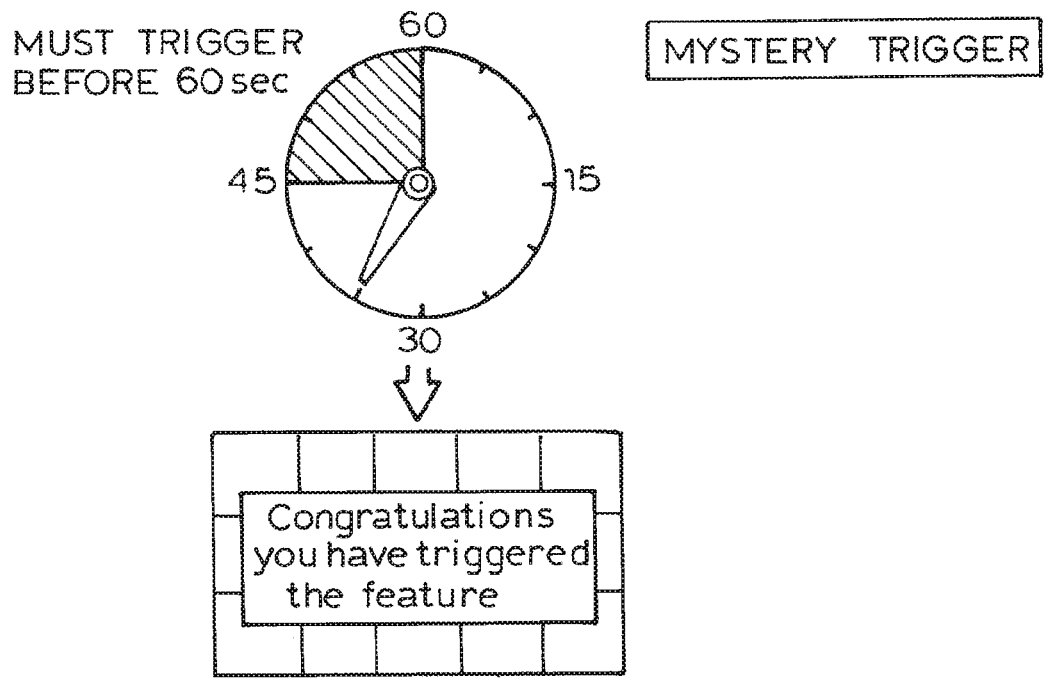

Symbol triggered is shown in FIG. 4A where a specific icon combination appearing on the reels will trigger the start of the feature game of skill Random triggering based on a probability based single event driven by the RNG as shown in FIG. 4B By a mystery trigger as shown in FIG. 4C. the mystery trigger is calculated at the completion of the last feature game with a random time value chosen to lie between the game timer's minimum and maximum value (eg between 0 and 60 seconds for an analogue game timer display).

Once the feature game of skill is triggered, the time allocated on the game timer display may also be incremented by the way in which the feature was triggered.

Figure 3A:
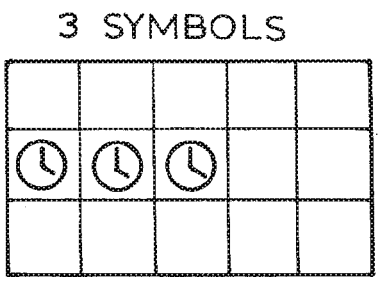
FIGS. 3A-3C schematically illustrate operation of a game timer display.
Figure 3A:
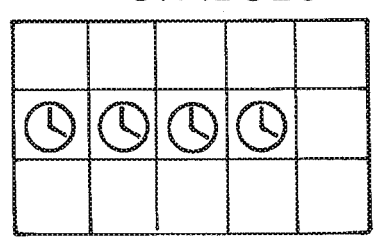
Figure 3A:
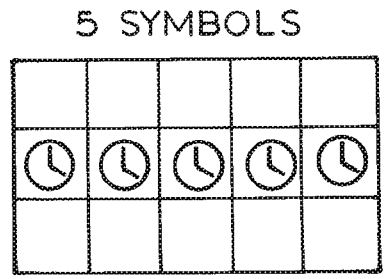
Figure 3B:
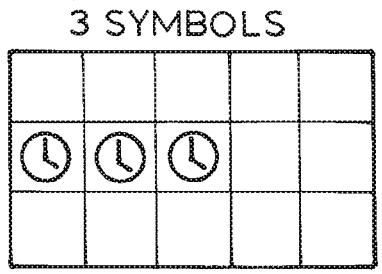
Figure 3B:
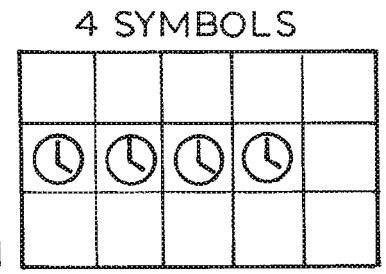
Figure 3B:
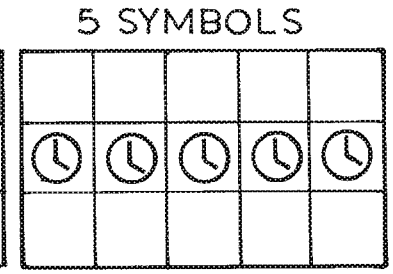
Figure 3C:
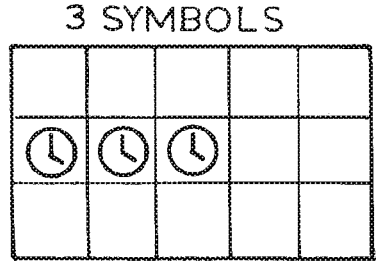
Figure 3C:
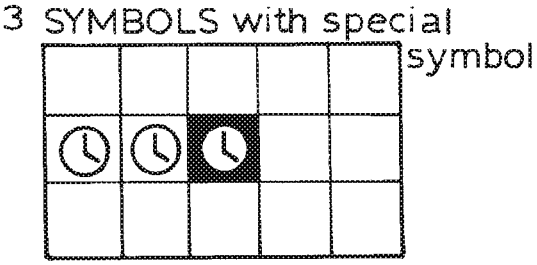

The elapse of a fixed amount of time based on the triggering of the skill-based game and displayed as shown in FIG. 3A a variable amount of time based on the number of trigger icons that triggered the feature game and displayed as shown in FIG. 3B a variable amount of time based on the type of icons involved in triggering the feature game of skill. This is shown in FIG. 3C During the game of skill, the score achieved within an allocated time may be used to increment the game timer with bonus playing time. This will be determined by the Algorithm. The manner of the event and the bonus playing time may be any means available and any time that is determined by the algorithm but is preferably any of the methods illustrated in FIGS. 2 and 3.

Once the feature game is triggered and is played in the game display space and the player initiates play, the game timer starts counting down. The feature game may be free games chance or preferably a game of skill. The feature game will be completed when the game timer counts down to a specified minimum or a maximum skill game result is achieved.

When the feature game is completed the game timer is reset to a start-up value and the incrementing process restarts. A hidden amount of time may be added based on events that have happened in the previous game play. Any time left on the game timer when the feature game finishes may be lost or carried over depending on the choices available within the algorithm parameters.

Figure 5:
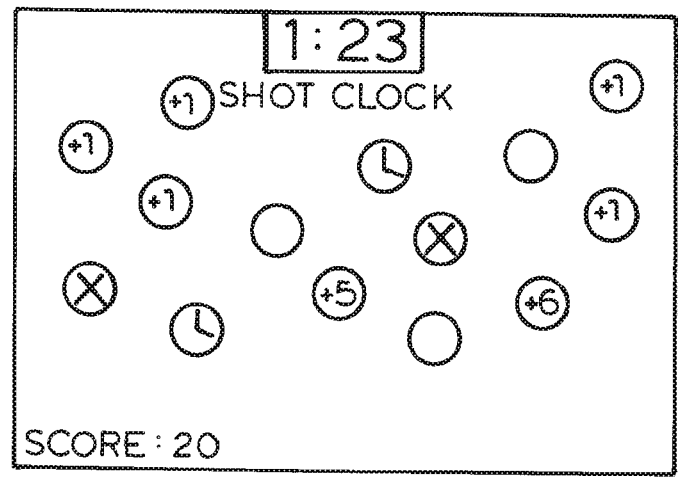
FIG. 5 schematically illustrates a screen shot of a dexterity-based game of skill.

The game of skill may be a dexterity-based game as illustrated in FIG. 5. In this game bubbles travel across the screen and the player can pop them by touching them. The player has the time displayed on the game timer to pop as many bubbles as possible. The popping of a bubble increments the skill score. The bubbles may have various values such as score rewards, or remove or add time to the game timer. The player obtains a skill score based on the incrementing of the score until the total playing time elapses or until a maximum score is achieved.

An example is described below in which the time-based feature is called the pop clock and the skill game is called pop shots.

Rules for Generating the Time-Based Feature
The "Pop Clock" is a time based progressive
The Pop Clock will start at 20 seconds
For every clock symbol that appears on the reels during a game evaluation, 1 second will be added to the "Pop Clock"
When the Pop Shots feature is triggered, the skill-based game is played for the amount of time that is displayed on the Pop Clock at the point of trigger
During the skill-based game the clock will count down and when the clock reaches zero the skill feature is over Rules for the Skill-Based Game
When the Pop Shots feature is triggered the player will play the Pop Shots skill game for the amount of time on the Pop Clock.
During the skill-based feature the aim is to pop as many bubbles as possible, with 1 point being added to their score for every bubble popped.
There are multiplier bubbles that when popped will mean each subsequent bubble popped for the next 5 seconds will score 2 points instead of 1
There may be time add bubbles that will add an additional 5 seconds to the Pop Clock when popped
There are chicken bubbles that when popped will prevent the player from popping any scoring bubbles until the player taps the on-screen graphics multiple times to make the large chicken disappear.
Once the Pop Clock has counted down to zero, the players score is then used to award the player a group of multipliers that are then applied during the free game sequence.

Figure 6:
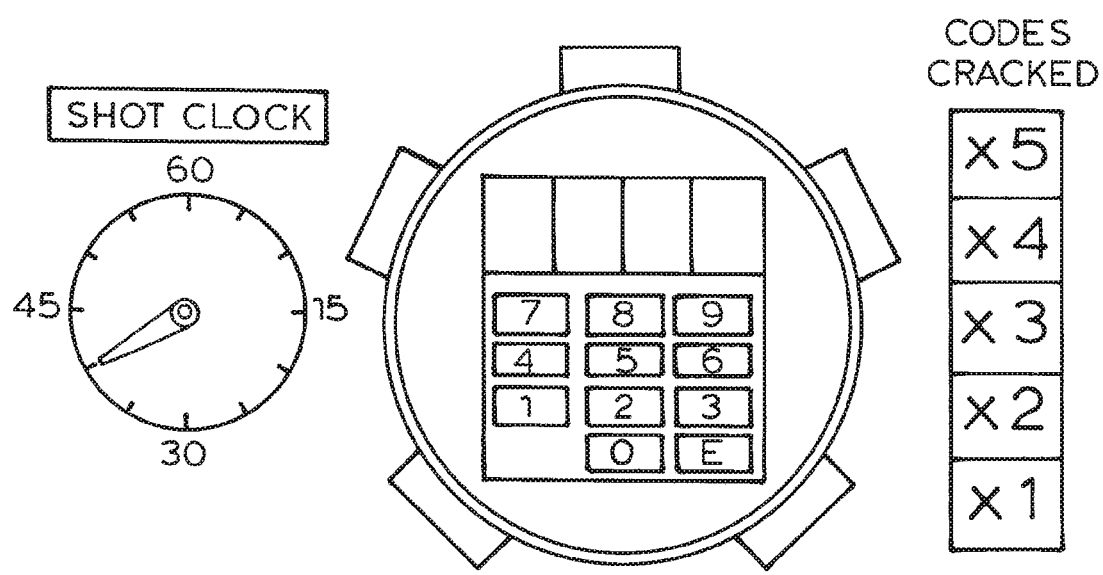
FIG. 6 schematically illustrates a screen shot of a strategy-based game of skill.

The game of skill may be a strategy-based game and an example is shown in FIG. 6. A safe dial is shown and the player needs to key a 4-digit code having no repeated numbers in the code. The game screen may display the correct code numbers as they are keyed in the correct position, so that the player can select the remaining code elements from the numbers that have not been keyed.

For example, when the correct number is in the correct position the number is locked in and is green. If the correct number is placed in the wrong position the number lights up as yellow. If a number that is not in the code is keyed it lights up as red.

In this game a maximum number of codes may be set at 5 so that when 5 different random codes are identified the game ends. However, if the game timer counts down to zero before the maximum number is achieved the feature game is also concluded.

Each time a code is entered, the time on the game timer will increment; and when a code is correctly identified the timer will increment.

The game ends when the game timer reaches zero or 5 codes have been cracked. The skill score is calculated using time on the timer and a multiplier which increases with each code that is correctly identified. Each time a code is identified the time remaining is multiplied by the current multiplier and added to the score display.

The skill-based award for both types of skill games may be used to determine the monetary based prize the player has won. The player may be awarded one of four bet proportional bonus prizes for example

| Level 4 | $ 5.00 | based on a score within the range 0-50 |
| Level 3 | $10.00 | based on a score within the range 51-1000 |
| Level 2 | $25.00 | based on a score within the range 101-150 |
| Level 1 | $50.00 | based on a score within the range 151+ |

Alternatively, the reward may be an improved secondary feature experience. For example:
Level 4: 5 free games
Level 3: 10 free games
Level 2: 15 free games
Level 1: 20 free games In another alternative it may be a flat number of free games with the level dictating a multiplier for the value that could be won:
Level 4: 1×
Level 3: 2×

Level 2: 3×
Level 1: 5×

For each gaming machine, government regulations require that there be a minimum return to player (RTP) over the life if the machine and this is determined by an algorithm based on an RNG. An example of a regulated minimum return is 87% and the venue operator may be prepared to tolerate a maximum return to player that is higher for example up to 97%.

When the gaming machine includes the game of skill and the game timer arrangement of this invention the algorithm is modified to include a component which is a function of the time provided for additional games and the skill score. For example, the Algorithm can be configured so that the RNG component provides a minimum RTP such as 80% and the game time function and skill score function provide the remainder, so that a basic skilled player would over the lifetime of the machine or online game achieve the minimum regulated RTP whereas a more skilled player would approach the maximum RTP as set by the venue. Those skilled in the art would appreciate how the Algorithm may be configured to provide the above noted outcomes.

Those skilled in the art will appreciate that this invention provides a unique and advantageous means of improving the gaming experience.

Those skilled in the art will also realise that this invention may be implemented in embodiments other than those described without departing from the core teachings of this invention.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, any means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

The following sections I-VII provide a guide to interpreting the present specification.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this specification", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present specification, including anything which may be incorporated by reference", unless expressly specified otherwise.

The phrase "at least one of", when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things, does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 2, 3, 4, . . . 9) and non-whole numbers (e.g., 1.1, 1.2, . . . 1.9).

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Indication

The term "indication" is used in an extremely broad sense. The term "indication" may, among other things, encompass a sign, symptom, or token of something else.

The term "indication" may be used to refer to any indicia and/or other information indicative of or associated with a subject, item, entity, and/or other object and/or idea.

As used herein, the phrases "information indicative of" and "indicia" may be used to refer to any information that represents, describes, and/or is otherwise associated with a related entity, subject, or object.

Indicia of information may include, for example, a symbol, a code, a reference, a link, a signal, an identifier, and/or any combination thereof and/or any other informative representation associated with the information.

In some embodiments, indicia of information (or indicative of the information) may be or include the information itself and/or any portion or component of the information. In some embodiments, an indication may include a request, a solicitation, a broadcast, and/or any other form of information gathering and/or dissemination.

IV. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

V. Disclosed Examples and Terminology are not Limiting

Neither the Title nor the Abstract in this specification is intended to be taken as limiting in any way as the scope of the disclosed invention(s). The title and headings of sections provided in the specification are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognise that the disclosed invention(s) may be practised with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, operations, algorithms or the like may be described in a particular sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

VI. Computing

It will be readily apparent to one of ordinary skill in the art that the various processes described herein may be implemented by, e.g., appropriately programmed general purpose computers, special purpose computers and computing devices.

Typically a processor (e.g., one or more microprocessors, one or more micro-controllers, one or more digital signal processors) will receive instructions (e.g., from a memory or like device), and execute those instructions, thereby performing one or more processes defined by those instructions.

A "processor" means one or more microprocessors, central processing units (CPUs), computing devices, micro-controllers, digital signal processors, or like devices or any combination thereof.

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments.

Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fibre optics, including the wires that comprise a system bus coupled to the processor. Transmission media may include or convey acoustic waves, light waves and electromagnetic emissions, such as those generated during radio frequency (RF) and infra-red (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviours of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices that are adapted to communicate with the computer. Any number and type of devices may be in communication with the computer.

In an embodiment, a server computer or centralised authority may not be necessary or desirable. For example, the present invention may, in an embodiment, be practised on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

It should be noted that where the terms "server", "secure server" or similar terms are used herein, a communication device is described that may be used in a communication system, unless the context otherwise requires, and should not be construed to limit the present invention to any particular communication device type. Thus, a communication device may include, without limitation, a bridge, router, bridge-router (router), switch, node, or other communication device, which may or may not be secure.

It should also be noted that where a flowchart is used herein to demonstrate various aspects of the invention, it should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Various embodiments of the invention may be embodied in many different forms, including computer program logic for use with a processor (e.g., a microprocessor, microcontroller, digital signal processor, or general purpose computer and for that matter, any commercial processor may be used to implement the embodiments of the invention either as a single processor, serial or parallel set of processors in the system and, as such, examples of commercial processors include, but are not limited to Merced™, Pentium™, Pentium II™, Xeon™, Celeron™, Pentium Pro™, Efficeon™, Athlon™, AMD™ and the like), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an exemplary embodiment of the present invention, predominantly all of the communication between users and the server is implemented as a set of computer program instructions that is converted into a computer executable form, stored as such in a computer readable medium, and executed by a microprocessor under the control of an operating system.

Computer program logic implementing all or part of the functionality where described herein may be embodied in various forms, including a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML. Moreover, there are hundreds of available computer languages that may be used to implement embodiments of the invention, among the more common being Ada; Algol; APL; awk; Basic; C; C++; Conol; Delphi; Eiffel; Euphoria; Forth; Fortran; HTML; Icon; Java; Javascript; Lisp; Logo; Mathematica; MatLab; Miranda; Modula-2; Oberon; Pascal; Perl; PL/I; Prolog; Python; Rexx; SAS; Scheme; sed; Simula; Smalltalk; Snobol; SQL; Visual Basic; Visual C++; Linux and XML.) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g, a RAM, ROM, PROM, EEPROM, or Flash-Programmable RAM), a magnetic memory device (e.g., a diskette or fixed disk), an optical memory device (e.g., a CD-ROM or DVD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and inter-networking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality where described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL). Hardware logic may also be incorporated into display screens for implementing embodiments of the invention and which may be segmented display screens, analogue display screens, digital display screens, CRTs, LED screens, Plasma screens, liquid crystal diode screen, and the like.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

The invention claimed is:

1. A gaming system for operation on a mobile user interface or in an internet browser which includes:
    a display unit configured to display a gaming interface, and a score interface;
    a console for receiving payment instructions from a player; a game controller programmed to present at least one game of chance
    said game controller including a random number generator, a score calculator and a timer;
    a display controller activated by said game controller to display said game of chance and to display a score and a game timer;
    said game controller including a program that runs an algorithm that determines that the long-term return to player (RTP) from the gaming machine lies between a minimum specified percentage and a maximum specified percentage;
    said algorithm including functions dependent on the random number generator (RNG), and the time provided for the game of chance;
    wherein the algorithm is arranged to provide a minimum RTP from the RNG component plus an additional time component for a player to achieve a higher RTP.

2. A gaming system as claimed in claim 1 in which a game of skill is also provided and displayed for playing during the additional time rewarded to the player.

3. A gaming system as claimed in claim 2 in which the game of skill is a game of dexterity or a strategy game.

4. A gaming system for operation on a mobile user interface or in an internet browser which includes:
    a display unit configured to display a gaming interface, and a score interface;

a console for receiving payment instructions from a player;

a game controller programmed to present at least one game of chance and at least one game of skill;

said game controller including a random number generator (RNG), a score calculator and a timer adapted for providing time for the game of chance and additional time for the at least one game of skill;

a display controller activated by said game controller to display at least one of said game of chance and one of said game of skill and to display a score and a game timer;

said game controller including a program that runs an algorithm that determines that the long-term return to player (RTP) from the gaming machine lies between a minimum specified percentage and a maximum specified percentage;

said algorithm including functions dependent on the random number generator (RNG), the additional time provided for the game of skill and the score from the game of skill.

5. A gaming system as claimed in claim 4 in which the game of skill is a game of dexterity or a strategy game.

6. A method of operating a gaming system in which a game controller presents a casino style game using a display controller to display a casino style game and also displays a score and a game timer;

said game controller includes a random number generator, a score calculator and a timer and also includes a program that runs an algorithm that determines that the long-term return to player (RTP) from the gaming machine lies between a minimum specified percentage and a maximum specified percentage;

said algorithm including functions dependent on the random number generator (RNG), time provided for the game of chance, and additional time for a player to achieve a higher RTP.

7. A method of operating a gaming system as claimed in claim 6 in which said display controller activated by said game controller displays at least one of said game of chance and one of said game of skill;

said game controller including a program that runs an algorithm that determines that the long-term return to player (RTP) from the gaming machine lies between a minimum specified percentage and a maximum specified percentage;

said algorithm including functions dependent on the random number generator (RNG), the additional time being provided for the game of skill and the score from the game of skill.

8. Apparatus adapted to operate a gaming system on a mobile user interface or in an internet browser, said apparatus including:

processor means adapted to operate in accordance with a predetermined instruction set, said apparatus, in conjunction with said instruction set, being adapted to perform the method as claimed in claim 6.

9. A computer program product including:

a computer usable medium having computer readable program code and computer readable system code embodied on said medium for operating a gaming system within a data processing system, said computer program product including:

computer readable code within said computer usable medium for performing the method steps of claim 6.

* * * * *